United States Patent
Saito et al.

(10) Patent No.: US 9,403,561 B2
(45) Date of Patent: Aug. 2, 2016

(54) MOUNTING STRUCTURE OF SHEET METAL PANEL

(71) Applicant: VOLVO TRUCKS CORPORATION, Goteborg (SE)

(72) Inventors: Takehiro Saito, Himeji (JP); Takaichi Arai, Saitama (JP); Toshimasa Yamamoto, Saitama (JP)

(73) Assignee: VOLVO TRUCKS CORPORATION, Göteborg (SE)

( * ) Notice: Subject to any disclaimer, the term of this patent is extended or adjusted under 35 U.S.C. 154(b) by 0 days.

(21) Appl. No.: 14/647,969

(22) PCT Filed: May 29, 2013

(86) PCT No.: PCT/JP2013/003389
§ 371 (c)(1),
(2) Date: May 28, 2015

(87) PCT Pub. No.: WO2014/083719
PCT Pub. Date: Jun. 5, 2014

(65) Prior Publication Data
US 2015/0298746 A1     Oct. 22, 2015

(30) Foreign Application Priority Data

Nov. 29, 2012    (JP) ................................. 2012-261141

(51) Int. Cl.
B62D 33/06      (2006.01)
B62D 27/02      (2006.01)

(52) U.S. Cl.
CPC ............. *B62D 33/06* (2013.01); *B62D 27/026* (2013.01)

(58) Field of Classification Search
CPC ... B62D 33/06; B62D 33/0621; B60R 21/131
USPC ....................................... 296/190.08, 190.03
See application file for complete search history.

(56) References Cited

U.S. PATENT DOCUMENTS 4,094,545 A * 6/1978 Kramer ................. B60R 21/131
                                                    280/756
6,149,228 A * 11/2000 O'Neill .............. B62D 33/0621
                                              296/190.01

(Continued)

FOREIGN PATENT DOCUMENTS

| JP | 2001-354036 | 12/2001 |
| JP | 2008-6912 | 1/2008 |
| JP | 2012-86733 | 5/2012 |

OTHER PUBLICATIONS

PCT International Preliminary Report on Patentability dated Jun. 11, 2015 in corresponding International Patent Application No. PCT/JP2013/003389.

(Continued)

*Primary Examiner* — Pinel Romain

(57) ABSTRACT

A mounting structure of a sheet metal panel including mounting brackets which are mounted on a peripheral edge portion of a glass-mounting opening formed on a rear-side panel of a cab, and after tentatively holding the sheet metal panel, a peripheral edge of the sheet metal panel is adhered to the rear-side panel in a periphery of the glass-mounting opening, wherein an inclined surface protruding toward a rear of the cab is provided to the rear-side panel along the glass-mounting opening, and the peripheral edge of the sheet metal panel is bent along the inclined surface and extended in the inclined surface direction to make clearance between the peripheral edge and the inclined surface gradually narrowed, to provide an adhesive reservoir between the sheet metal panel and the rear-side panel, and the peripheral edge of the sheet metal panel is in close contact with the inclined surface thereby sealing therebetween.

1 Claim, 4 Drawing Sheets

(56) References Cited

U.S. PATENT DOCUMENTS

| | | | |
|---|---|---|---|
| 8,157,317 B2 * | 4/2012 | Orii | B62D 25/04 296/190.01 |
| 2011/0057479 A1 * | 3/2011 | Namura | B62D 33/0617 296/190.08 |

OTHER PUBLICATIONS

International Search Report mailed on Jul. 30, 2013 in corresponding International Patent Application No. PCT/JP2013/003389.

Japanese Office Action dated Feb. 2, 2016 in corresponding Japanese Patent Application No. 2012-261141.

* cited by examiner

Prior Art

MOUNTING STRUCTURE OF SHEET METAL PANEL

CROSS REFERENCE TO RELATED APPLICATIONS

This application is a U.S. National Stage Application claiming the benefit of prior filed International Application Number PCT/JP2013/003389, filed May 29, 2013, in which the International Application claims a priority date of Nov. 29, 2012 based on prior filed Japanese Patent Application Number 2012-261141, the entire contents of which are incorporated herein by reference.

TECHNICAL FIELD

The present invention relates to a mounting structure of a sheet metal panel, and specifically relates to a mounting structure of a sheet metal panel with respect to a glass-mounting opening provided to a cab of a truck.

BACKGROUND ART

Conventionally, as illustrated in FIG. 7, a cab 1 of a truck has a glass-mounting opening 5 formed on a rear-side panel (back panel) 3 thereof, and a window glass 9 is mounted on the glass-mounting opening 5 by using a weather strip 7. Further, various propositions have been conventionally made regarding the mounting structure of window glass of this type, including one disclosed in Patent Document 1.

Meanwhile, there exists a vehicle which does not require a rear window glass according to specification, such as a large truck having a box-shaped loading space mounted thereon. In such a vehicle, a sheet metal panel, instead of the window glass, is post-mounted on the glass-mounting opening by using a weather strip (rubber seal) or an adhesive.

Incidentally, the aforementioned glass-mounting opening is used as a work hole of a welding robot arm in a welding main line of a cab, and as a work hole of a spot gun.

For this reason, if the glass-mounting opening is previously blocked by the sheet metal panel, it becomes impossible to perform a spot welding, and further, even if it is possible to perform the spot welding, tentatively, there is a need to perform a large-scale remodeling on the robot arm side.

Accordingly, the sheet metal panel is post-mounted on the glass-mounting opening after completing all of the spot welding of the cab, to thereby solve the above-described problem.
Patent Document 1: Japanese Unexamined Patent Application Publication No. 2012-86733

DISCLOSURE

Problems to be Solved

However, the post-mounting of the sheet metal panel with respect to the glass-mounting opening is manually conducted. For this reason, there are problems regarding an assembling workability and an assembling accuracy of the sheet metal panel with respect to the glass-mounting opening, and further, since it is not structured such that the glass-mounting opening is blocked by the sheet metal panel itself, it is required to perform sealing for securing water-tightness, and accordingly, a high assembling accuracy is desired.

Further, when the sheet metal panel is mounted on the glass-mounting opening by using an adhesive, for example, the adhesive sometimes flows out to a surface of the sheet metal panel or the like, and in such a case, a disadvantageous point that it takes time to perform post-processing of the adhesive, has also been pointed out.

The present invention was devised in view of such circumstances, and a proposition thereof is to provide a mounting structure of a sheet metal panel realizing an improvement of an assembling easiness and an assembling accuracy of the sheet metal panel, at a time of mounting the sheet metal panel on a glass-mounting opening of a cab.

Means for Solving the Problems

In order to achieve such a proposition, the present invention is characterized in that it is a mounting structure of a sheet metal panel including mounting brackets which are mounted on a peripheral edge portion of a glass-mounting opening formed on a rear-side panel of a cab, and made to tentatively hold the sheet metal panel, a peripheral edge of the sheet metal panel being made to adhere to the rear-side panel in a periphery of the glass-mounting opening after the tentative holding, in which an inclined surface which protrudes toward a rear of the cab is provided to the rear-side panel along the glass-mounting opening, and the peripheral edge of the sheet metal panel is bent along the inclined surface and extended in a direction of the inclined surface to make a clearance between the peripheral edge of the sheet metal panel and the inclined surface to be gradually narrowed, to provide an adhesive reservoir between the sheet metal panel and the rear-side panel, and the peripheral edge of the sheet metal panel is brought into close contact with the inclined surface, and sealing is performed on a position between the peripheral edge and the inclined surface.

Effects

According to the present invention, when the sheet metal panel is mounted on the cab, the peripheral edge of the sheet metal panel is inclined so that a tip thereof comes close to the inclined surface over the whole circumference, so that it becomes easy to perform positioning of the sheet metal panel with respect to the inclined surface, and it becomes possible to favorably perform alignment between the sheet metal panel and the mounting brackets, resulting in that the tentative holding of the sheet metal panel by the mounting brackets can be easily performed.

Further, since the peripheral edge of the sheet metal panel is extended in the direction of the inclined surface to form the adhesive reservoir, there is no chance that the adhesive flows out to the outside from the adhesive reservoir, resulting in that the problem such as the post-processing of the adhesive flowed out to the outside, can be solved.

Furthermore, the sheet metal panel is adhered using the adhesive, the peripheral edge of the sheet metal panel is then deformed in the direction of the inclined surface, and the sealing is performed after the tip of the peripheral edge is made to be brought into close contact with the inclined surface, resulting in that the reliable water-tightness between the sheet metal panel and the panel can be secured.

Besides, even if there is generated a variation to some degree in the clearance between the peripheral edge of the sheet metal panel and the inclined surface, by making the peripheral edge to be deformed toward the inclined surface and brought into close contact with the inclined surface in the above-described manner, it is possible to absorb the variation in the dimensional error of the peripheral edge.

Further, since no change is made to the conventional structure of the glass-mounting opening, it is possible to mount a window glass on the glass-mounting opening by omitting the mounting brackets.

DETAILED DESCRIPTION OF EMBODIMENTS

Hereinafter, an embodiment of the present invention will be described in detail based on the drawings.

Figure 1:
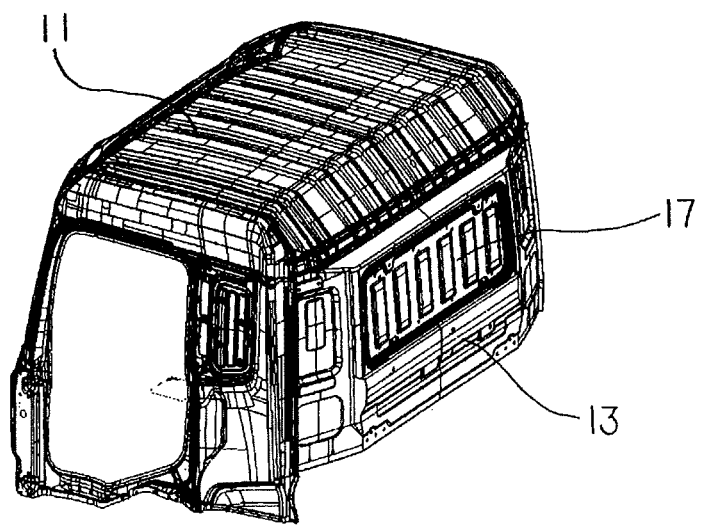
FIG. 1 is a perspective view of a backside of a cab in which a sheet metal panel is mounted on a rear-side glass-mounting opening with the use of a mounting structure according to one embodiment of the present invention.
Figure 2:
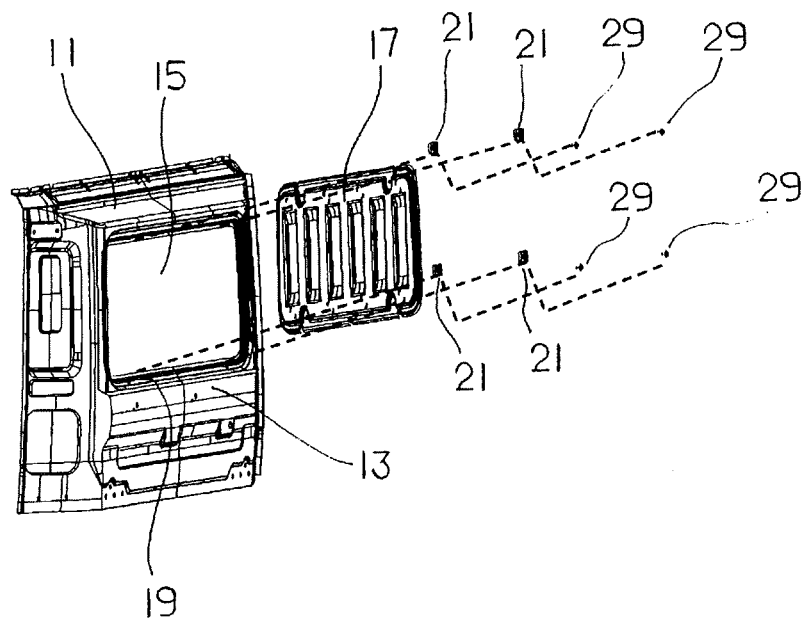
FIG. 2 is an exploded perspective view of a mounting structure of a sheet metal panel.
Figure 4:
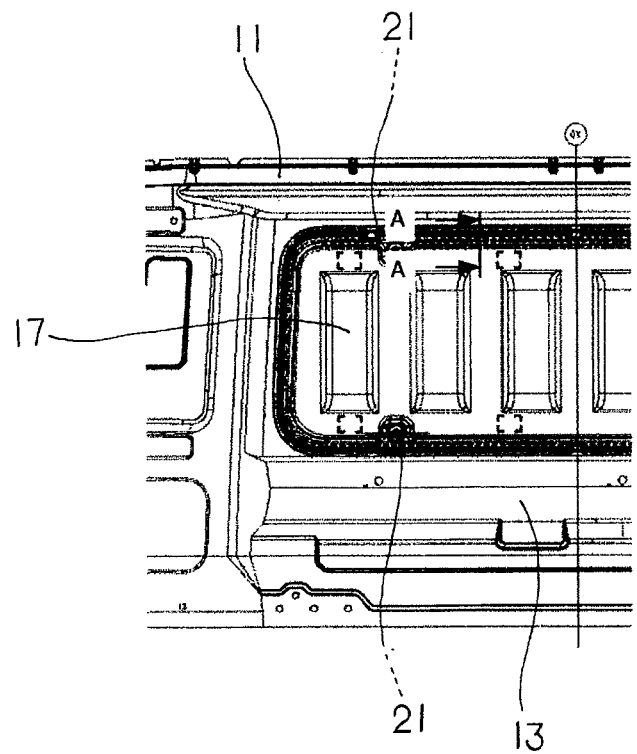
FIG. 4 is a back view of the cab.

In FIG. 1, 11 denotes a cab of a cab-over-type truck, and a glass-mounting opening 15 is provided to a rear-side panel (back panel) 13 of the cab 11, as illustrated in FIG. 2. Further, as illustrated in FIG. 1 and FIG. 4, one piece of sheet metal panel 17 is mounted on the rear-side panel 13 by covering the glass-mounting opening 15.

Figure 3:
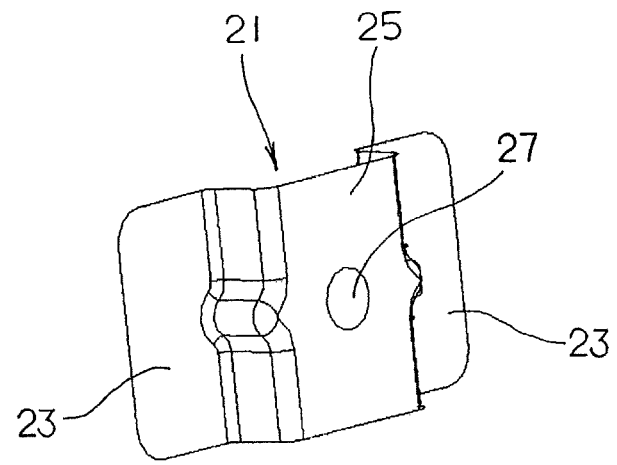
FIG. 3 is a perspective view of a mounting bracket.

As illustrated in FIG. 2, when the sheet metal panel 17 is mounted on the panel 13, mounting brackets 21 illustrated in FIG. 3 are welded at four top and bottom predetermined positions on a peripheral edge portion 19 of the glass-mounting opening 15.

The mounting bracket 21 is formed to have a U-shaped cross section with flat mounting flanges 23 provided at right and left portions thereof, and when the right and left mounting flanges 23 are welded to the peripheral edge portion 19, the mounting bracket 21 is fixed to the peripheral edge portion 19. Further, a bolt hole 27 is provided at a center of a top portion 25 of each of the mounting brackets 21, and one piece of the sheet metal panel 17 is tentatively held by the four mounting brackets 21 using bolts 29 so as to cover the glass-mounting opening 15.

Figure 5:
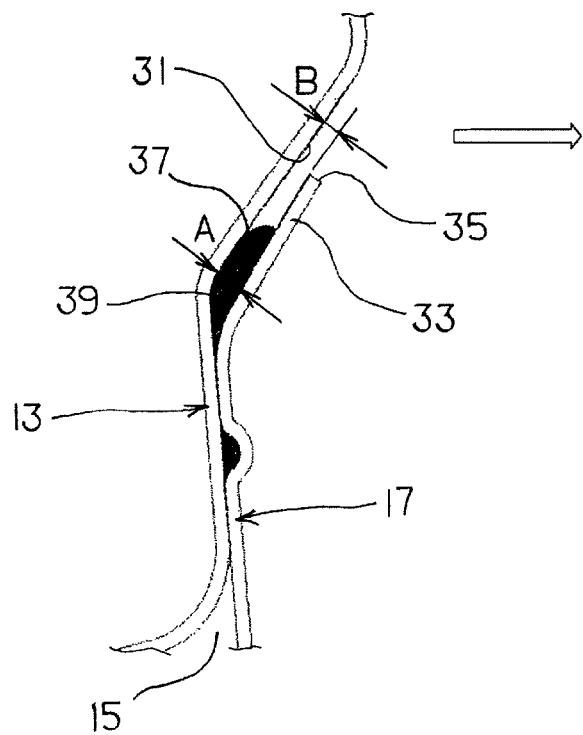
FIG. 5 is a sectional view of the sheet metal panel and an inclined surface before performing sealing.

As illustrated in FIG. 5, to the rear-side panel 13, an inclined surface 31 which protrudes toward the rear of the cab 11 (in a direction of arrow mark in the drawing) is provided along the whole circumference of the glass-mounting opening 15, with a slight distance provided between the inclined surface 31 and the glass-mounting opening 15.

Meanwhile, a peripheral edge 33 of the sheet metal panel 17 is bent along the inclined surface 31, and is extended to have a long length in a direction of the inclined surface 31 so that a clearance between the peripheral edge 33 and the inclined surface 31 is gradually narrowed toward a tip 35. Further, when the sheet metal panel 17 is tentatively held by the mounting brackets 21 as described above, the sheet metal panel 17, except for the peripheral edge 33, abuts against the rear-side panel 13, and as a result of this, there is formed a clearance between the peripheral edge 33 of the sheet metal panel 17 and the panel 13, as illustrated in FIG. 5, and the clearance is designed to function as an adhesive reservoir 37. After the sheet metal panel 17 is tentatively held by the mounting brackets 21, an adhesive 39 is injected and filled in the adhesive reservoir 37.

Further, as a result of extending the peripheral edge 33 of the sheet metal panel 17 in the direction of the inclined surface 31 so that the clearance between the peripheral edge 33 and the inclined surface 31 is gradually narrowed toward the tip 35, as described above, when the sheet metal panel 17 is tentatively held by the mounting brackets 21, as an example, a clearance A, between the inclined surface 31 and the peripheral edge 33, of the adhesive reservoir 37 is about 2 mm, and on the other hand, a clearance B between the tip 35 of the peripheral edge 33 and the inclined surface 31 is approximately 1 mm, which is narrower than the clearance A.

Figure 6:
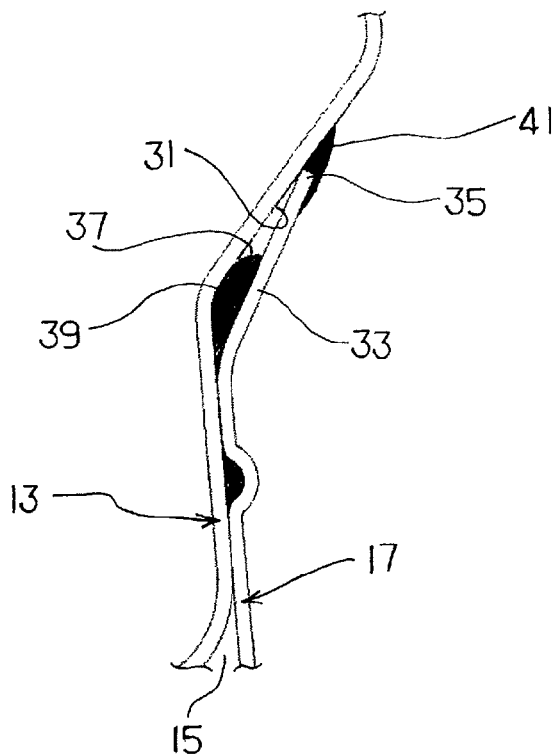
FIG. 6 is a sectional view taken along line A-A in FIG. 4.
Figure 7:
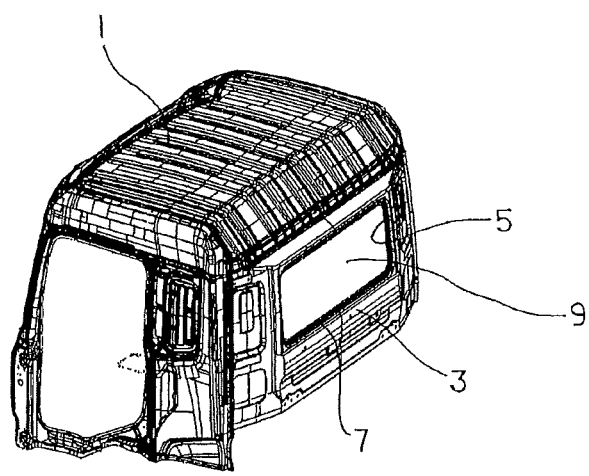
FIG. 7 is a perspective view of a backside of a cab in which a window glass is mounted on a rear-side glass-mounting opening.

Further, after the sheet metal panel 17 is tentatively held by the mounting brackets 21, heat is applied to the adhesive 39 to make the peripheral edge 33 of the sheet metal panel 17 adhere to the periphery (the inclined surface 31) of the rear-side panel 13, the peripheral edge 33 is deformed in the direction of the inclined surface 31 to make the tip 35 to be brought into close contact with the inclined surface 31, and paint sealing 41 is performed on a position between the tip 35 of the peripheral edge 33 and the inclined surface 31, as illustrated in FIG. 6, resulting in that the water-tightness between the sheet metal panel 17 and the panel 13 is designed to be secured.

Since the present embodiment is configured as above, when the sheet metal panel 17 is mounted on the cab 11, the four mounting brackets 21 are first welded at the four top and bottom predetermined positions on the peripheral edge portion 19 of the glass-mounting opening 15, as illustrated in FIG. 2.

After that, a worker bolts the sheet metal panel 17 to the mounting brackets 21, in which since the peripheral edge 33 of the sheet metal panel 17 is inclined in the direction of the inclined surface 31, as described above, when the sheet metal panel 17 is approximated to the glass-mounting opening 15, the tip 35 of the peripheral edge 33 of the sheet metal panel 17 comes close to the inclined surface 31 over the whole circumference. For this reason, it becomes easy to perform the positioning of the sheet metal panel 17 with respect to the inclined surface 31, and it becomes possible to favorably perform the alignment between the sheet metal panel 17 and the mounting brackets 21, resulting in that the sheet metal panel 17 can be easily bolted to and tentatively held by the mounting brackets 21.

Subsequently, when, after the sheet metal panel 17 is tentatively held, the adhesive 39 is injected and filled in the adhesive reservoir 37 and heat is applied to the adhesive 39, the peripheral edge 33 of the sheet metal panel 17 adheres to the inclined surface 31 and the sheet metal panel 17 is mounted on the cab 11, in which since the peripheral edge 33 of the sheet metal panel 17 is extended to have a long length in the direction of the inclined surface 31, there is no chance that the adhesive 39 flows out to the outside from the adhesive reservoir 37.

Thereafter, when the peripheral edge 33 is deformed in the direction of the inclined surface 31 to make the tip 35 to be brought into close contact with the inclined surface 31, and the paint sealing 41 is performed on the position between the tip 35 of the peripheral edge 33 and the inclined surface 31, as illustrated in FIG. 6, the water-tightness between the sheet metal panel 17 and the panel 13 is secured.

As described above, the present embodiment has (a) an advantageous point that it becomes easy to perform the positioning of the sheet metal panel 17 with respect to the inclined surface 31, and it becomes possible to favorably perform the alignment between the sheet metal panel 17 and the mounting brackets 21, resulting in that the tentative holding of the sheet metal panel 17 by the mounting brackets 21 can be easily performed when mounting the sheet metal panel 17 on the cab 11, since the peripheral edge 33 of the sheet metal panel 17 is inclined so that the tip 35 thereof comes close to the inclined surface 31 over the whole circumference.

(b) The peripheral edge 33 of the sheet metal panel 17 is extended to have a long length in the direction of the inclined surface 31 to form the adhesive reservoir 37, so that there is no chance that the adhesive 39 flows out to the outside from the adhesive reservoir 37, resulting in that the problem such as the post-processing of the adhesive flowed out to the outside, can be solved.

(c) Since the paint sealing 41 can be performed after the sheet metal panel 17 is adhered by the adhesive 39, the peripheral edge 33 of the sheet metal panel 17 is then deformed in the direction of the inclined surface 31, and the tip 35 is brought into close contact with the inclined surface 31, it is possible to secure the reliable water-tightness between the sheet metal panel 17 and the panel 13.

Besides, even if there is generated a variation to some degree in the clearance between the peripheral edge 33 of the sheet metal panel 17 and the inclined surface 31, by making the peripheral edge 33 to be deformed toward the inclined surface 31 and brought into close contact with the inclined surface 31 in the above-described manner, it is possible to absorb the variation in the dimensional error of the peripheral edge 33.

(d) Further, since no change is made to the conventional structure of the glass-mounting opening 15, it is possible to mount a window glass on the glass-mounting opening 15 by omitting the mounting brackets 21.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

The invention claimed is:

1. A mounting structure of a sheet metal panel, comprising
a sheet metal panel which is mounted on a glass-mounting opening of a rear-side of a cab to block up the glass-mounting opening, wherein
an inclined surface in a tapered-form which protrudes toward a rear of the cab is provided in a peripheral edge of the glass-mounting opening to surround the glass-mounting opening,
a peripheral edge of the sheet metal panel is bent in a direction of the inclined surface and extended in the direction of the inclined surface to make a clearance between the inclined surface and the peripheral edge of the sheet metal panel to be gradually narrowed,
an adhesive reservoir is provided in the clearance between the inclined surface and the peripheral edge of the sheet metal panel, and
the inclined surface and a tip of the peripheral edge of the sheet metal panel are brought into close contact and sealed.

* * * * *